(12) United States Patent
Pinti et al.

(10) Patent No.: US 12,181,445 B2
(45) Date of Patent: Dec. 31, 2024

(54) PULL TESTING INSPECTION TOOLS FOR WIRES OR OTHER COMPONENTS UNDER TEST

(71) Applicant: Raytheon Company, Waltham, MA (US)

(72) Inventors: Richard M. Pinti, Needham, MA (US); John A. Cogliandro, Dedham, MA (US); Heather A. Adams, Tucson, AZ (US)

(73) Assignee: Raytheon Company, Tewksbury, MA (US)

( * ) Notice: Subject to any disclaimer, the term of this patent is extended or adjusted under 35 U.S.C. 154(b) by 494 days.

(21) Appl. No.: 17/456,920

(22) Filed: Nov. 30, 2021

(65) Prior Publication Data

US 2022/0244150 A1    Aug. 4, 2022

Related U.S. Application Data

(60) Provisional application No. 63/144,370, filed on Feb. 1, 2021.

(51) Int. Cl.
*G01N 3/08* (2006.01)
*G01L 5/00* (2006.01)
(Continued)

(52) U.S. Cl.
CPC .............. *G01N 3/08* (2013.01); *G01N 3/062* (2013.01); *G01L 5/0033* (2013.01);
(Continued)

(58) Field of Classification Search
CPC ........ G01L 5/0033; G01N 3/08; G01N 3/062; G01N 2203/0017; G01N 2203/04; G01N 2203/0605; G01M 99/007; G01M 99/00
See application file for complete search history.

(56) References Cited

U.S. PATENT DOCUMENTS

| | | | |
|---|---|---|---|
| 756,175 A | 3/1904 | Meisselbach | |
| 3,572,108 A * | 3/1971 | McShane et al. | .... G01L 5/0033 73/862.01 |

(Continued)

FOREIGN PATENT DOCUMENTS

| | | | |
|---|---|---|---|
| FR | 2830324 A1 | 4/2003 | |
| FR | 3116015 A1 * | 5/2022 | |

(Continued)

OTHER PUBLICATIONS

International Search Report and Written Opinion of the International Searching Authority dated May 17, 2022 in connection with International Patent Application No. PCT/US2021/065102, 16 pages.

Invitation to Pay Additional Fees and, where Applicable, Protest Fee dated Mar. 24, 2022 in connection with International Patent Application No. PCT/US2021/065102, 12 pages.

(Continued)

*Primary Examiner* — Jonathan M Dunlap (57) ABSTRACT

An apparatus includes a portable device, which includes a connector configured to contact or grasp a portion of a component and to apply a force on the component during a pull test of the component. The portable device also includes a handle configured to be pulled to apply the force on the component during the pull test of the component. The portable device further includes an indicator configured to at least one of: (i) identify the force being applied to the component during the pull test and (ii) identify when a specified amount of force has been applied to the component during the pull test.

20 Claims, 9 Drawing Sheets

(51) Int. Cl.
    *G01M 99/00* (2011.01)
    *G01N 3/06* (2006.01)
(52) U.S. Cl.
    CPC ... *G01M 99/007* (2013.01); *G01N 2203/0017* (2013.01); *G01N 2203/04* (2013.01); *G01N 2203/0605* (2013.01)

(56) References Cited

U.S. PATENT DOCUMENTS

| | | | |
|---|---|---|---|
| 4,895,028 A | | 1/1990 | Mayer |
| 5,894,981 A | | 4/1999 | Kelly |
| 6,041,660 A | * | 3/2000 | Fujitaka ............ G01N 3/08 73/826 |
| 2001/0032517 A1 | * | 10/2001 | Reinemann, Jr. ..... G01L 5/0033 73/826 |
| 2010/0264936 A1 | * | 10/2010 | Tarone ............... G01L 5/0033 324/538 |
| 2015/0328757 A1 | * | 11/2015 | Schwertner ............ G01N 3/08 73/761 |
| 2017/0315034 A1 | * | 11/2017 | Morgan ................ G01N 3/066 |
| 2021/0348997 A1 | * | 11/2021 | Currie ................. G01N 3/62 |

FOREIGN PATENT DOCUMENTS

| | | | | |
|---|---|---|---|---|
| GB | 2330915 A | * | 5/1999 | .......... G01L 5/0033 |
| JP | S56-041228 U | | 4/1981 | |

OTHER PUBLICATIONS

Molex Application Tooling Group, "Auto Grip Pull Tester," Operation Manual, PT-1500, Order No. 63801-9100, Doc. No. TM-638019100, Revision D, Nov. 2015, 17 pages.

Mark-10 Corp., "Plug and Test Wire Crimp Pull Sensors Series R06," Data Sheet, 32-1205, Jul. 2018, 1 page.

Mark-10 Corp., "Plug and Test Technology Smart Force and Torque Sensors," User's Guide, 32-1143, Jan. 2012, 16 pages.

Electromatic Equipment Co., Inc., "Check-Line Mechanical Tension Meters," DX2-Series, Bulletin N610-1, Oct. 2010, 2 pages.

Electromatic Equipment Co., Inc., "Check-Line Hand-Held Tension Meter, Model DX2," Operating Manual, Feb. 2012, 7 pages.

Mark-10 Corp., "Professional Digital Force Gauges Series 7," Data Sheet, 32-1167, Oct. 2020, 4 pages.

Mark-10 Corp., "Digital Force Gauges Series 7," User's Guide, 32-1169, 2012, 41 pages.

Mark-10 Corp., "Professional Force/Torque Indicator Model 7i," Data Sheet, 32-1175, Oct. 2020, 5 pages.

Mark-10 Corp., "Plug and Test Technology Digital Force/Torque Indicator Model M7i," User's Guide, 32-1176, Nov. 2017, 44 pages.

IdeaStage Promotions, LLC, "Mini Digital Hanging Scale," ISP ID: 766033311, Mfg. Sku. 98597, 2010-2021, 1 page.

Search Results Under Rule 164(2)(b) EPC dated Oct. 9, 2024 in connection with European Patent Application No. 21847642.2, 10 pages.

Notice of Reasons for Refusal dated Nov. 5, 2024 in connection with counterpart Japanese Patent Application No. 2023-546205, 12 pages.

* cited by examiner

PULL TESTING INSPECTION TOOLS FOR WIRES OR OTHER COMPONENTS UNDER TEST

CROSS-REFERENCE TO RELATED APPLICATION AND PRIORITY CLAIM

This application claims priority under 35 U.S.C. § 119(e) to U.S. Provisional Patent Application No. 63/144,370 filed on Feb. 1, 2021, which is hereby incorporated by reference in its entirety.

TECHNICAL FIELD

This disclosure relates generally to inspection tools. More specifically, this disclosure relates to pull testing inspection tools for wires or other components under test.

BACKGROUND

Various electrical connectors are available for receiving and forming electrical connections with wires or other components. For example, some electrical connectors operate by having an operator or a machine push one end of a wire into an electrical connector to create a one-way lock. In some cases, the electrical connector uses spring-loaded metal teeth that are angled and that grip the wire in one direction and resist motion of the wire in the opposite direction.

SUMMARY

This disclosure provides pull testing inspection tools for wires or other components under test.

In a first embodiment, an apparatus includes a portable device, which includes a connector configured to contact or grasp a portion of a component and to apply a force on the component during a pull test of the component. The portable device also includes a handle configured to be pulled to apply the force on the component during the pull test of the component. The portable device further includes an indicator configured to at least one of: (i) identify the force being applied to the component during the pull test and (ii) identify when a specified amount of force has been applied to the component during the pull test.

In a second embodiment, a method includes contacting or grasping a component to be tested during a pull test of the component with a connector of a portable device. The method also includes pulling on a handle of the portable device to cause the connector to apply a force on the component during the pull test of the component. The method further includes using an indicator of the portable device to at least one of: (i) identify the force being applied to the component during the pull test and (ii) identify when a specified amount of force has been applied to the component during the pull test.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 6A through 9 illustrate example uses of pull testing inspection tools according to this disclosure.

DETAILED DESCRIPTION

FIGS. 1 through 9, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, various electrical connectors are available for receiving and forming electrical connections with wires or other components. For example, some electrical connectors operate by having an operator or a machine push one end of a wire into an electrical connector to create a one-way lock. In some cases, the electrical connector uses spring-loaded metal teeth that are angled and that grip the wire in one direction and resist motion of the wire in the opposite direction.

Unfortunately, if a wire's insulation is not stripped properly, the wire is not inserted properly into an electrical connector, the wire is mis-sized for the connector, or a pin of the electrical connector is not seated properly, it may feel like the wire has been inserted and locked properly by the metal teeth or otherwise properly secured by the electrical connector. However, in reality, the wire may simply be held in place by friction of the poorly-stripped insulation or by the bent or oversized wire itself, rather than by the connector. Moreover, in some situations, it may be hard for a tester or other personnel to grab a wire in order to conduct a pull test, such as when a system has already been deployed in the field or a sub-system has already been assembled and there is little physical access to the wires of the system or sub-system. In addition, pull testing may be hard to perform in severe conditions, such as when a tester is wearing gloves, during winter, when it is raining or snowing, during wartime, or when noise, sand, wind, or other environmental factors are present.

This disclosure provides various pull testing inspection tools that can be used during pull testing to apply a force on a wire or other component under test. For example, as described in more detail below, each pull testing inspection tool includes at least one hook or other connector that may be placed around, receive, be coupled to, be secured to, or otherwise contact a portion of a wire or other component being tested. Each pull testing inspection tool also includes a handle that may be pulled by an operator, robot, or other tester to apply a force on the wire or other component. Each pull testing inspection tool further includes an indicator that may identify the force being applied to the wire or other component and/or identify when a specified amount of force has been applied to the wire or other component. In some cases, a zip-tie or other temporary clamp can be used with any of the pull testing inspection tools in order to provide a secure connection to the wire or other component being tested, which can help improve testing of the wire or other component and provide consistency of operation for repetitive use. Also, in some embodiments, a temporary or permanent friction lever or other mechanism can be used to help grab the wire or other component prior to testing.

Each pull testing inspection tool can be used to verify whether a wire has been properly inserted into and secured by an electrical connector, to verify whether a wire has been properly soldered or otherwise spliced to another wire, or to verify some other condition of a wire or other component being tested. For example, each pull testing inspection tool may allow an operator to determine whether each wire or other component being tested meets a minimum standard (such as a minimum pull force), such as to determine whether the wire is securely held in place by teeth or other components of a wire connector. The pull testing inspection tools can be inexpensively produced, provide repeatable results, be adaptable to various field conditions, and provide visible or audible success or failure indications (such as when a snap of the tool can be felt by hand or a buzzer of the tool can be heard). Also, the pull testing inspection tools may provide ease-of-use and require minimal training. In some cases, the pull testing inspection tools may be very lightweight, possibly weighing no more than a standard mobile smartphone, which is useful since the pull testing inspection tools are portable handheld devices. In addition, the pull testing inspection tools can operate non-destructively and may only apply a force to a wire or other component being tested equivalent to what a human hand might otherwise apply to the wire or other component in normal operation. In some cases, the pull testing inspection tools can purposely release a wire or other component being tested at a set force to prevent damage to or destruction of the component. In some cases, the application of suitable force to a wire by a pull testing inspection tool can actually help seat the wire correctly in an electrical connector.

While there are various pull testers available ranging from those that pull on small electrical connectors up to those that pull on large ski-tram, sailboat, and mountain climbing cables, they are generally not suitable for use with already-assembled electrical components, and they are generally not suitable for field operations involving electrical components and can often damage delicate components. Depending on the implementations, the pull testing inspection tools of this disclosure may use scales, trip fuses, meters, or other components that support pull testing of an already-assembled wire connector from the wire end (not the connector end). For example, each pull testing inspection tool may grab a wire or other component being tested using a cam-lock or zip-tie with a hook or other connector attached to a fuse assembly, tension meter, digital scale, or other component of the pull testing inspection tool. As a result, there may be no need to grab the connector itself during the pull testing, which is often required with other pull testers. In some cases, the pull testing inspection tools may be configured to obtain purchase on a wire or other object being tested in a tightly-confined space.

It should be noted here that while the pull testing inspection tools are often described in this patent document as being used for inspecting the quality of wire insertions into electrical connectors, this is for illustration and explanation only. The pull testing inspection tools disclosed in this patent document may be used for pull testing that involves any other suitable components or joints or unions of components. Thus, the pull testing inspection tools described below may be used in any other suitable environment and for any other suitable purpose. Also, while the pull testing inspection tools are often described in this patent document as being used by human testers, the pull testing inspection tools may be used by robots or any other suitable automated or other system. As a particular example, a robotic system may use one or more optical sensors or other sensors to help position a pull testing inspection tool, and the robotic system may apply a force on the pull testing inspection tool once it is positioned properly in order to perform a pull test.

Figure 1:
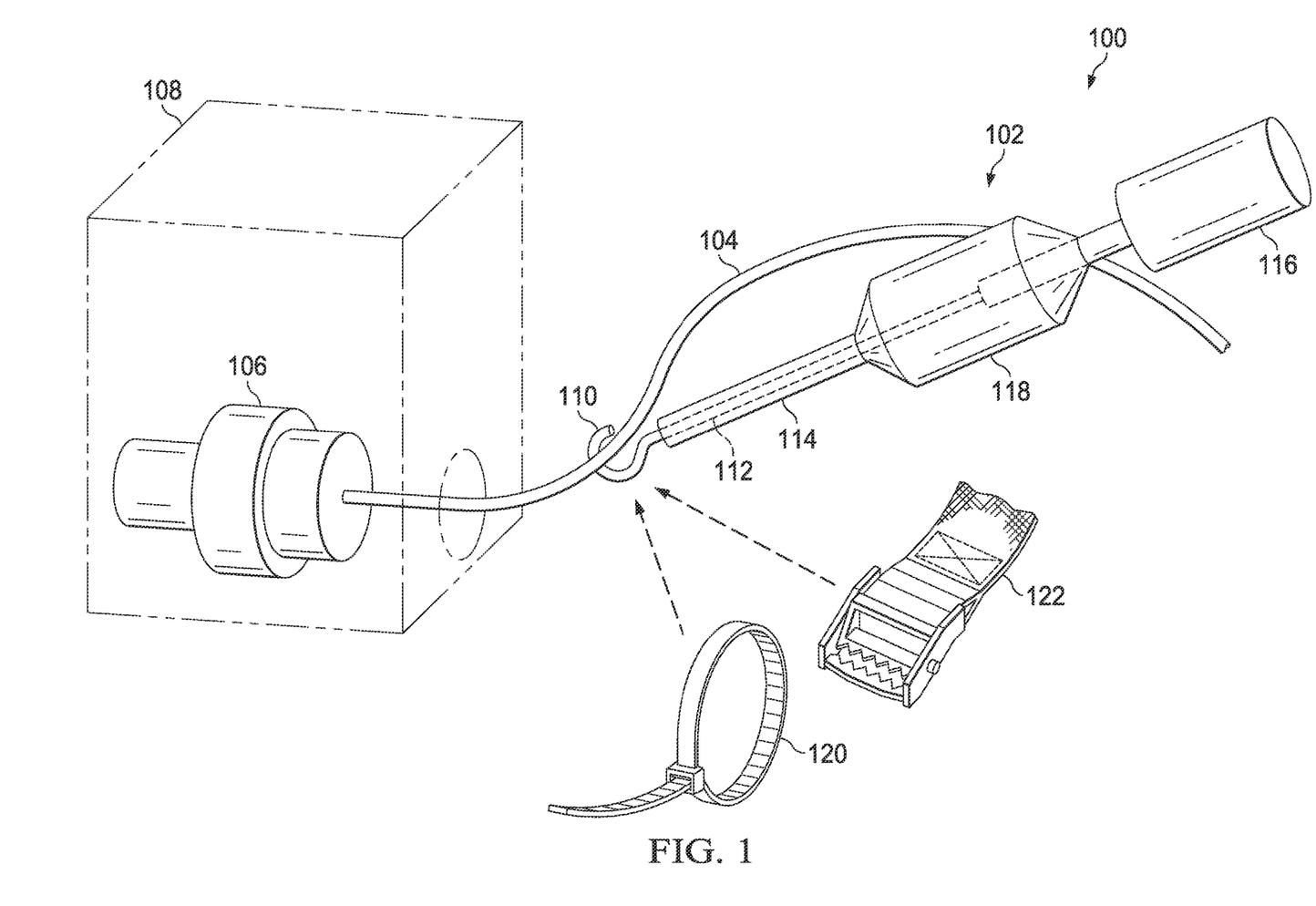
FIG. 1 illustrates an example system in which a pull testing inspection tool may be used according to this disclosure.

FIG. 1 illustrates an example system 100 in which a pull testing inspection tool 102 may be used according to this disclosure. As shown in FIG. 1, the system 100 includes a wire 104 to be tested, where the wire 104 is (ideally) secured by an electrical connector 106. The inspection tool 102 is used here to verify whether the wire 104 is adequately secured by the electrical connector 106, which may or may not be apparent or easily testable depending on the circumstances. For instance, in this particular example, the electrical connector 106 is positioned within a case 108, which can obscure a tester's ability to view the electrical connector 106. The inspection tool 102 may therefore be used by an operator to pull on the wire 104 and test whether the wire 104 is suitably secured by the electrical connector 106. Note, however, that the inspection tool 102 may be used to test any other suitable wire that is supposed to be secured by any other suitable electrical connector (regardless of whether the electrical connector is positioned within or obscured by a case or other structure). Moreover, as noted above, the inspection tool 102 may be used to conduct a pull test on any other suitable component. In addition, note that the sizes of various components shown in FIG. 1 are exaggerated for ease of illustration and explanation.

The inspection tool 102 in this example includes a connector 110, which can be placed around, receive, be coupled to, be secured to, or otherwise contact a portion of the wire 104. When the inspection tool 102 is pulled by an operator, the connector 110 applies a force on the wire 104, pulling on the wire 104 and allowing a determination of whether the wire 104 is properly secured by the electrical connector 106. The connector 110 represents any suitable structure configured to temporarily apply a force to a wire 104 or other component being tested. In this example embodiment, the connector 110 has the form of an open hook, which allows the wire 104 or other component being tested to pass through the opening of the hook and into the interior space of the hook. The opening in the hook may have any suitable size or angle, such as when the hook has an opening of about 30° or other suitable opening that allows the wire 104 or other component to be received into the hook. In some cases, the connector 110 may be coated in rubber or other low-durometer material, such as a soft or pliable material like a thermoplastic polyurethane gripping polymer (one example of which is gripping material TB400 from 3M). This material can provide a tackiness that helps in gripping the wire 104 or other component during pull testing. However, any other suitable connector 110 may be used here, such as a pair of structures that cooperate to capture a portion of the wire 104 or other component between the structures (one example of which is described below).

In some embodiments, the connector 110 may represent one of multiple interchangeable hooks or other interchangeable connectors 110 that may be used with different types or sizes of wires 104 or other components being tested. As a particular example, different connectors 110 may be used for testing wires 104 of different thicknesses or gauges, such as 12 to 22 American wire gauge (AWG) wires or wires of equivalent British, metric, or other measures. Each of one or more connectors 110 may be formed from any suitable material(s), such as high tensile wire spring steel coated with a soft or pliable material, and in any suitable manner.

In this example, at least a portion of a connecting wire 112 of the inspection tool 102 extends through a hollow shaft 114, and the connecting wire 112 couples the connector 110 to a handle 116 of the inspection tool 102. The connecting wire 112 may be formed from any suitable material(s) and in any suitable manner. Note, however, that the use of the connecting wire 112 is optional and that the connector 110 may be coupled to the handle 116 directly or indirectly in any other suitable manner. The shaft 114 may extend any suitable length along the inspection tool 102 and may be used to help position the connector 110, such as by moving the connector 110 so that a portion of the wire 104 or other component being tested passes into the connector 110. The shaft 114 may be formed from any suitable material(s), such as one or more metals or plastics, and in any suitable manner.

The handle 116 represents a portion of the inspection tool 102 that can be pulled by an operator in order to test the wire 104 or other component. The handle 116 may be formed from any suitable material(s), such as metal or plastic core covered with ergonomic foam, and in any suitable manner. The handle 116 may also have any suitable form. For example, in some embodiments, for example, the handle 116 may represent a straight or curved handle. In other embodiments, the handle 116 may form a partial or complete loop or other shape that facilitates positioning of and pulling on the inspection tool 102. In some cases, the handle 116 may be telescopic and lockable so that the length of the inspection tool 102 can be adjusted as needed or desired.

A housing 118 represents a portion of the inspection tool 102 in which the connector 110 is coupled to the handle 116 via the connecting wire 112. The shaft 114 can extend from the housing 118 such that, when an operator manipulates the handle 116, the shaft 114 is moved to position the connector 110 as needed or desired. The housing 118 may be formed from any suitable material(s), such as one or more metals or plastics, and in any suitable manner.

As described in more detail below, the handle 116, housing 118, or other portion of the inspection tool 102 includes an indicator that is configured to identify the force being applied to the wire 104 or other component being tested and/or identify when a specified amount of force has been applied to the wire 104 or other component being tested. For example, the indicator may include an analog or digital tension gauge that is configured to present the force being applied to the wire 104 or other component, a torque or other force meter that is configured to click/beep/vibrate when the specified amount of force has been applied to the wire 104 or other component, a fuse that is configured to break or separate when the specified amount of force has been applied to the wire 104 or other component, an analog or digital scale configured to present the force being applied to the wire 104 or other component, or a spring configured to release its grip when the specified amount of force has been applied to the wire 104 or other component. The indicator may provide one or more forms of recognizable feedback (such as audible or tactile feedback) in response to at least a specified amount of force being applied to the wire 104 or other component under test. This allows the operator of the inspection tool 102 to determine whether the wire 104 or other component is able to withstand at least a specified amount of force being applied to the wire 104 or other component.

In some instances, it may be necessary or desirable to hold the wire 104 or other component more securely to or using the connector 110 than can be achieved using only friction of the wire 104 or other component along the connector 110. In those instances, a temporary clamp (such as a zip-tie 120 or toothed clamp 122) may be used to allow the connector 110 to more-firmly grasp the wire 104 or other component during testing. Once testing is completed, the temporary clamp can be removed from the wire 104 or other component. If reusable, the temporary clamp may then be used to test another wire 104 or other component.

Also, in some instances, the pull testing inspection tool 102 may be configurable to provide feedback (such as audible or tactile feedback) at a force level that is slightly above and/or slightly below the desired amount of force to be applied to the wire 104 or other component. For example, the pull testing inspection tool 102 may be configurable to provide feedback at a force level that is about 5% above and/or about 5% slightly below the desired amount of force to be applied to the wire 104 or other component. This type of feedback can be used to help train human testers to apply generally the correct amount of force to wires or other components to be tested. Note that the 5% value here is for illustration only and can vary as needed or desired.

Although FIG. 1 illustrates one example of a system 100 in which a pull testing inspection tool 102 may be used, various changes may be made to FIG. 1. For example, the inspection tool 102 may be used with any other suitable wires regardless of how the wires are used, the electrical connectors used with the wires, and the positioning of the electrical connectors or wires. Also, as noted above, the inspection tool 102 may be used for pull testing of components other than wires. Further, the form factors for the inspection tool 102 itself and the various components of the inspection tool 102 can easily vary from what is shown in FIG. 1. In general, the inspection tool 102 itself can have any suitable size, shape, and dimensions, and each component of the inspection tool 102 can have any suitable size, shape, and dimensions.

Figure 2:
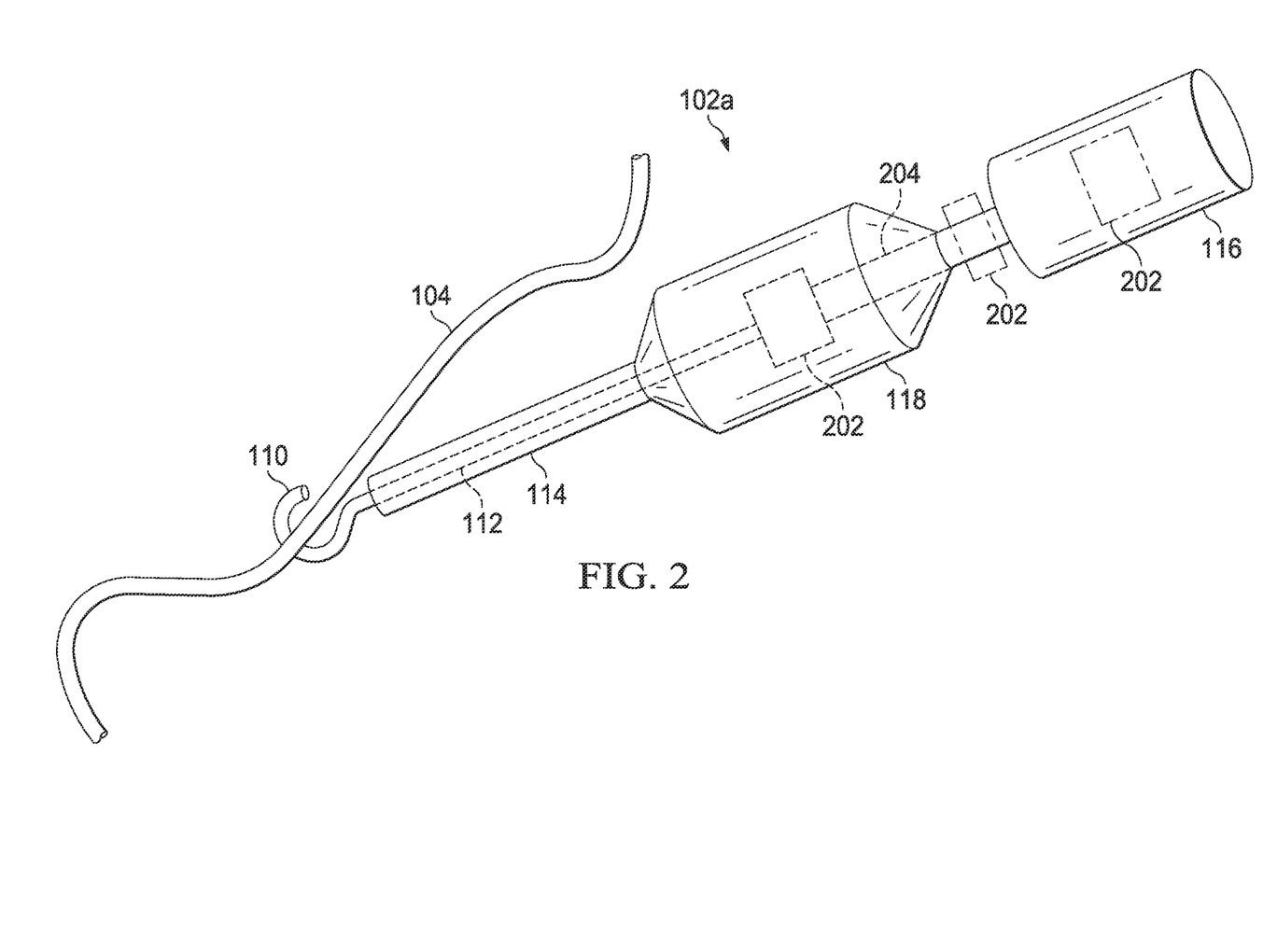
FIG. 2 illustrates a first example pull testing inspection tool according to this disclosure.

FIG. 2 illustrates a first example pull testing inspection tool 102a according to this disclosure. For ease of explanation, the inspection tool 102a may be described as being used in the system 100 to test the wire 104 of FIG. 1. However, the inspection tool 102a may be used for pull testing of any other suitable components in any other suitable systems.

As shown in FIG. 2, the inspection tool 102a includes a gauge or other indicator 202 positioned between the connecting wire 112 and a shaft 204 that is coupled to or that forms a part of the handle 116. Note, however, that the indicator 202 may be positioned elsewhere at any suitable location, such as along the shaft 204 or within the handle 116. The indicator 202 represents a gauge or other structure that can measure the force being applied to the wire 104 or other component under test or that can indicate when a specified amount of force has been applied to the wire 104 or other component under test.

In some cases, the indicator 202 may provide a measure (in digital or analog form) of the force being applied to the wire 104 or other component under test. In these cases, the indicator 202 may take the form of an analog or digital tension gauge, an analog or digital scale, or other mechanism that identifies the actual force being applied to the wire 104 or other component under test. An operator may view measurements provided by the tension gauge, scale, or other mechanism in order to determine if a suitable force has been applied to the wire 104 or other component under test.

Also, in some cases, the indicator 202 may provide audible, tactile, or other recognizable feedback (such as a vibration, snap, or beep) in response to at least a specified amount of force being applied to the wire 104 or other component under test. In those cases, the indicator 202 may take the form of a torque meter that clicks, a fuse that breaks or separates, or other mechanism that provides some type of identifiable feedback when the specified amount of force has been applied to the wire 104 or other component. An operator may use the feedback to determine if a suitable force has been applied to the wire 104 or other component under test. An example type of fuse that may be used as the indicator 202 is a plastic or other tension-breakable fuse link, such as a replaceable pin. The fuse can have a pin that breaks or physically separates when a "break away" tension is reached, which allows an operator to feel the physical break without requiring the inspection tool 102 be visible to the operator (which is useful in severe conditions). In some cases, this type of fuse may be injection-molded and may be disposable. The fuse may also be resettable, meaning that parts of the fuse may separate but be reconnectable after separation for testing of the same component or a different component.

A combination of these approaches may also be used. For example, the inspection tool 102a may include both (i) a tension gauge, scale, or other mechanism that outputs a measure of force applied to the wire 104 or other component and (ii) a torque meter, fuse, or other mechanism that generates recognizable feedback when a specified amount of force has been applied to the wire 104 or other component. In general, the inspection tool 102a may include any suitable type(s) of indicator(s) that provide information associated with the force applied to the wire 104 or other component during testing.

Figure 3:
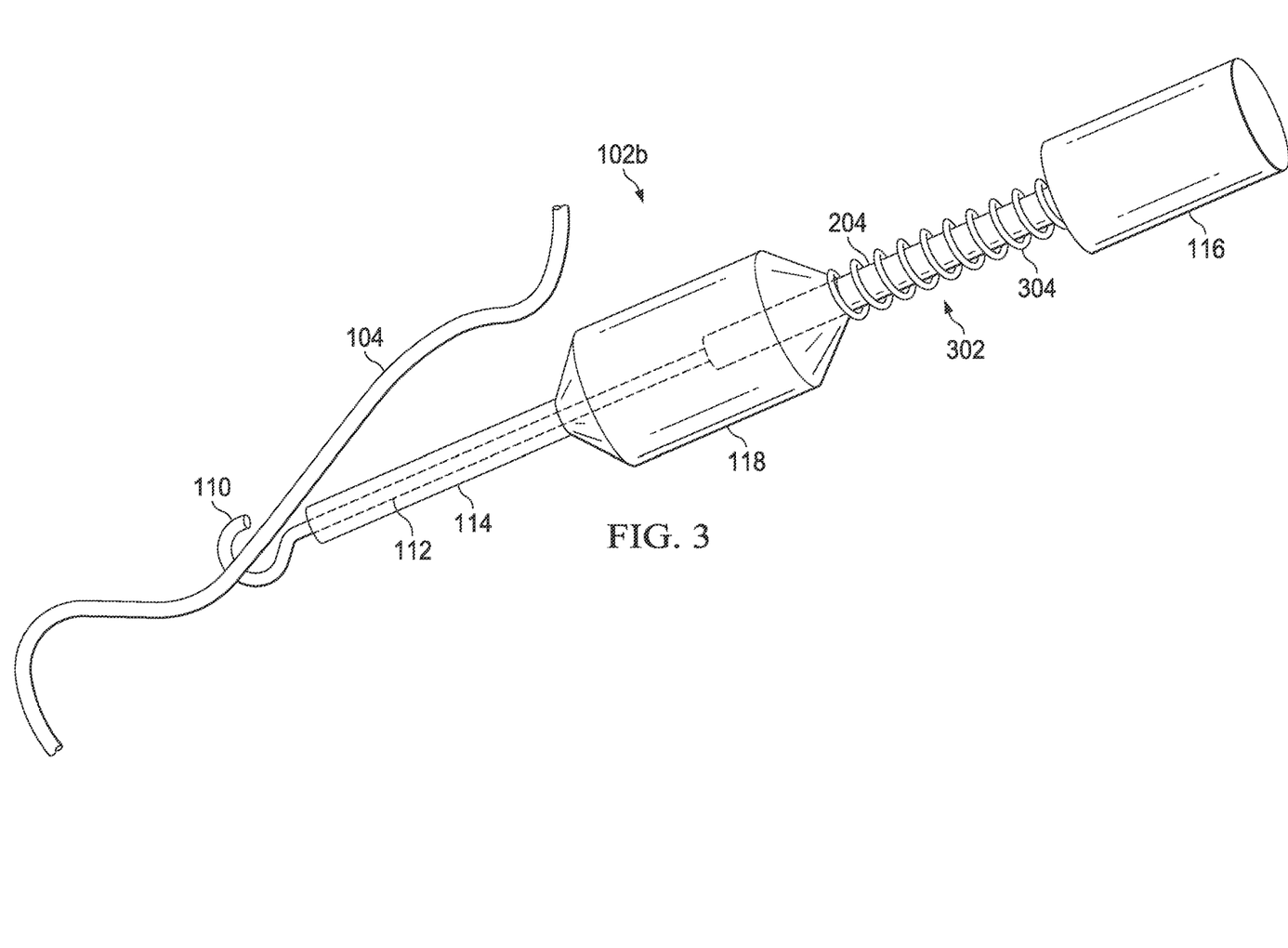
FIG. 3 illustrates a second example pull testing inspection tool according to this disclosure.

FIG. 3 illustrates a second example pull testing inspection tool 102b according to this disclosure. For ease of explanation, the inspection tool 102b may be described as being used in the system 100 to test the wire 104 of FIG. 1. However, the inspection tool 102b may be used for pull testing of any other suitable components in any other suitable systems.

As shown in FIG. 3, the inspection tool 102b includes a tension-based gravity scale 302, which includes a spring 304 wrapped around the shaft 204 coupled to or forming a part of the handle 116. The gravity scale 302 can display a measure of force based on how far the spring 304 is extended when force is applied to the wire 104 or other component under test. An operator may view the measurements as registered by the gravity scale 302 in order to determine if a suitable force has been applied to the wire 104 or other component under test.

Figure 4:
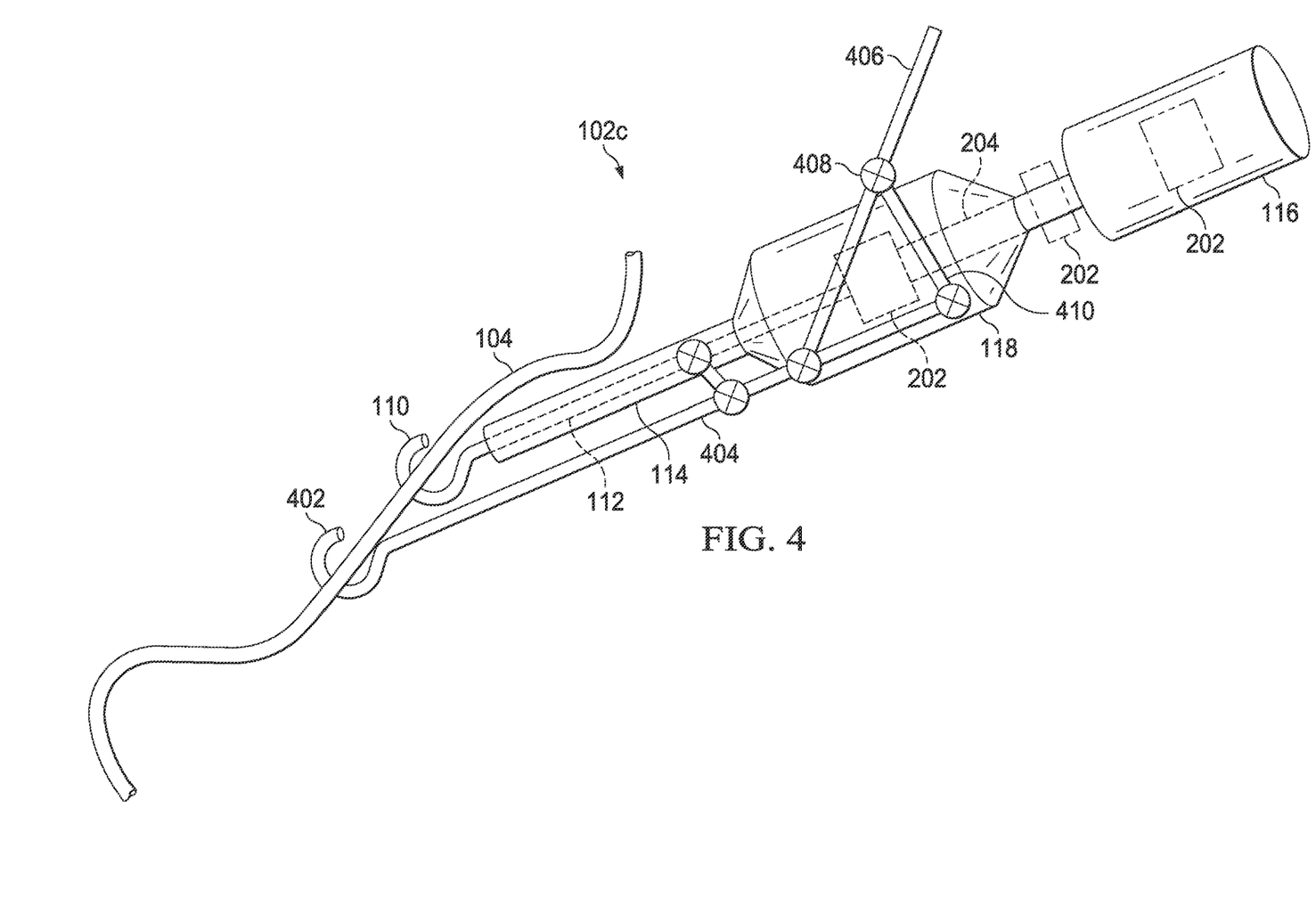
FIG. 4 illustrates a third example pull testing inspection tool according to this disclosure.

FIG. 4 illustrates a third example pull testing inspection tool 102c according to this disclosure. For ease of explanation, the inspection tool 102c may be described as being used in the system 100 to test the wire 104 of FIG. 1. However, the inspection tool 102c may be used for pull testing of any other suitable components in any other suitable systems.

As shown in FIG. 4, the inspection tool 102c is similar in form to the inspection tool 102a. However, the inspection tool 102c also includes a pre-grip manually-operated clamp that includes an additional connector 402 connected to a support shaft 404. The additional connector 402 here can be moved back and forth longitudinally (along the length of the inspection tool 102c) and somewhat side-to-side via rotation of a slide or lever 406. Pivot points 408 denote locations where the slide or lever 406, support shaft 404, and/or bars 410 are rotatably coupled to each other or to other components of the inspection tool 102c. In this example, pulling the free end of the slide or lever 406 backwards or towards the handle 116 causes the additional connector 402 to move forward or away from the connector 110. Pushing the free end of the slide or lever 406 forwards or away from the handle 116 causes the additional connector 402 to move backwards or towards the connector 110. This allows a portion of a wire 104 or other component under test to be securely clamped between the connectors 110 and 402, which may be useful in some cases (like when the wire 104 or other component under test is slippery). Collectively, the connectors 110 and 402 here can form a pre-grip clamp that can be used to clamp onto the wire 104 or other component under test.

While not shown here, a spring may be used to bias the slide or lever 406 in the forward position so that the connector 402 is pulled backwards without external influence. The spring force can be overcome by an operator pulling the slide or lever 406 backwards, which pushes the connector 402 forward. This may allow, for example, the connector 402 to be moved forward ahead of the connector 110 so that a wire 104 or other component can be placed between the connectors 110 and 402. Once the slide or lever 406 is released, the spring force can pull the connector 402 back towards the connector 110, allowing the connectors 110 and 402 to clamp onto the wire 104 or other component under test. The connectors 110 and 402 can continue clamping onto the wire 104 or other component even while an operator pulls on the wire 104 or other component using the inspection tool 102c during a pull test. However, if the operator attempts to apply excessive pulling force on the wire 104 or other component under test, the spring may allow the connectors 110 and 402 to separate and release the wire 104 or other component, thereby helping to avoid damage to the wire 104 or other component.

Note that while the connectors 110 and 402 are shown here as having the same form (open hooks in the same general orientation), this is not necessarily required. For example, the connectors 110 and 402 may have complementary forms that cooperate to clamp onto a wire 104 or other component positioned between the connectors 110 and 402. Also note that while the indicator 202 is shown here as being used, nothing prevents a pre-grip manually-operated clamp from being used in the inspection tool 102b having the gravity scale 302.

Figure 5A:
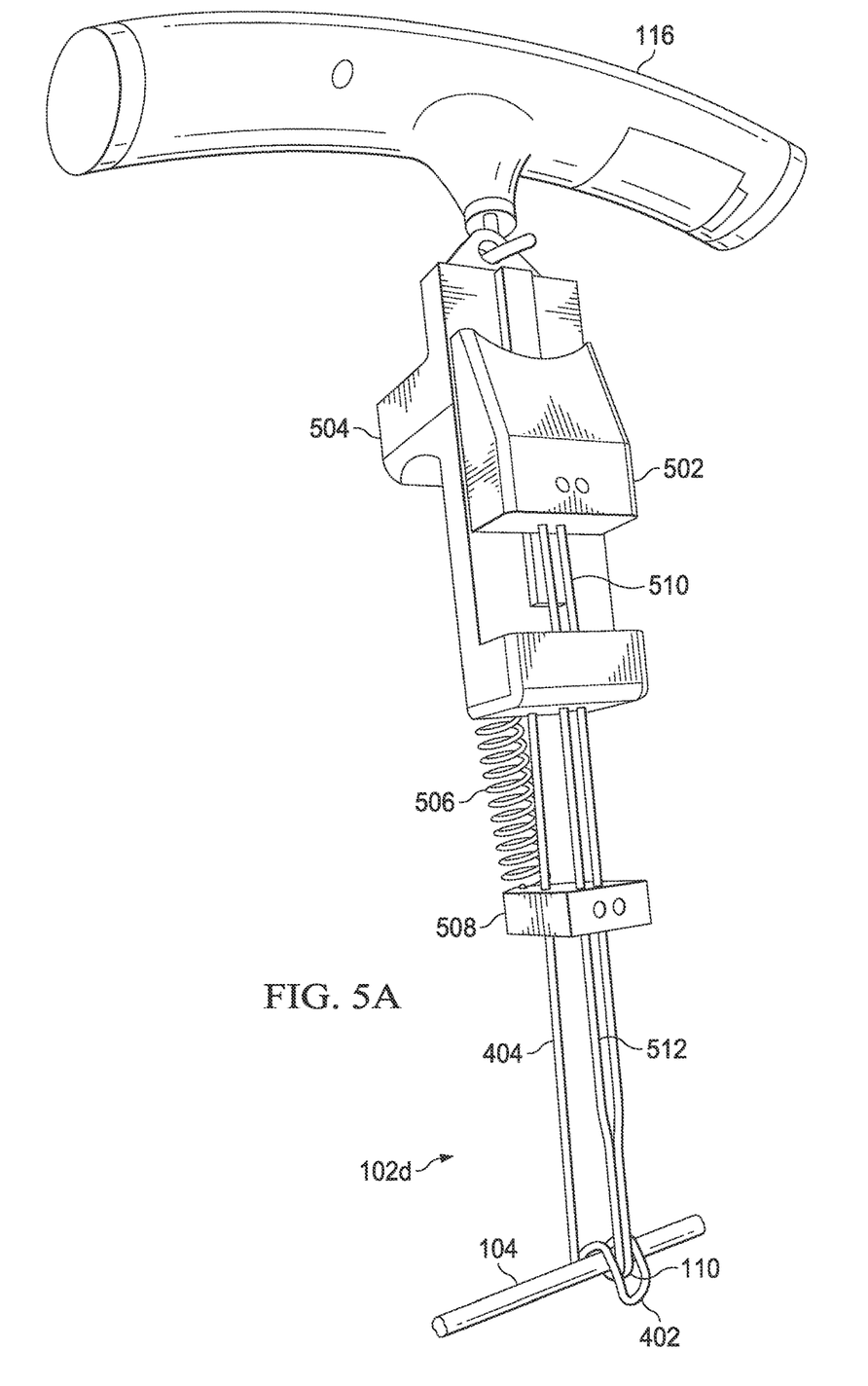
FIGS. 5A through 5C illustrate a fourth example pull testing inspection tool according to this disclosure.
Figure 5B:
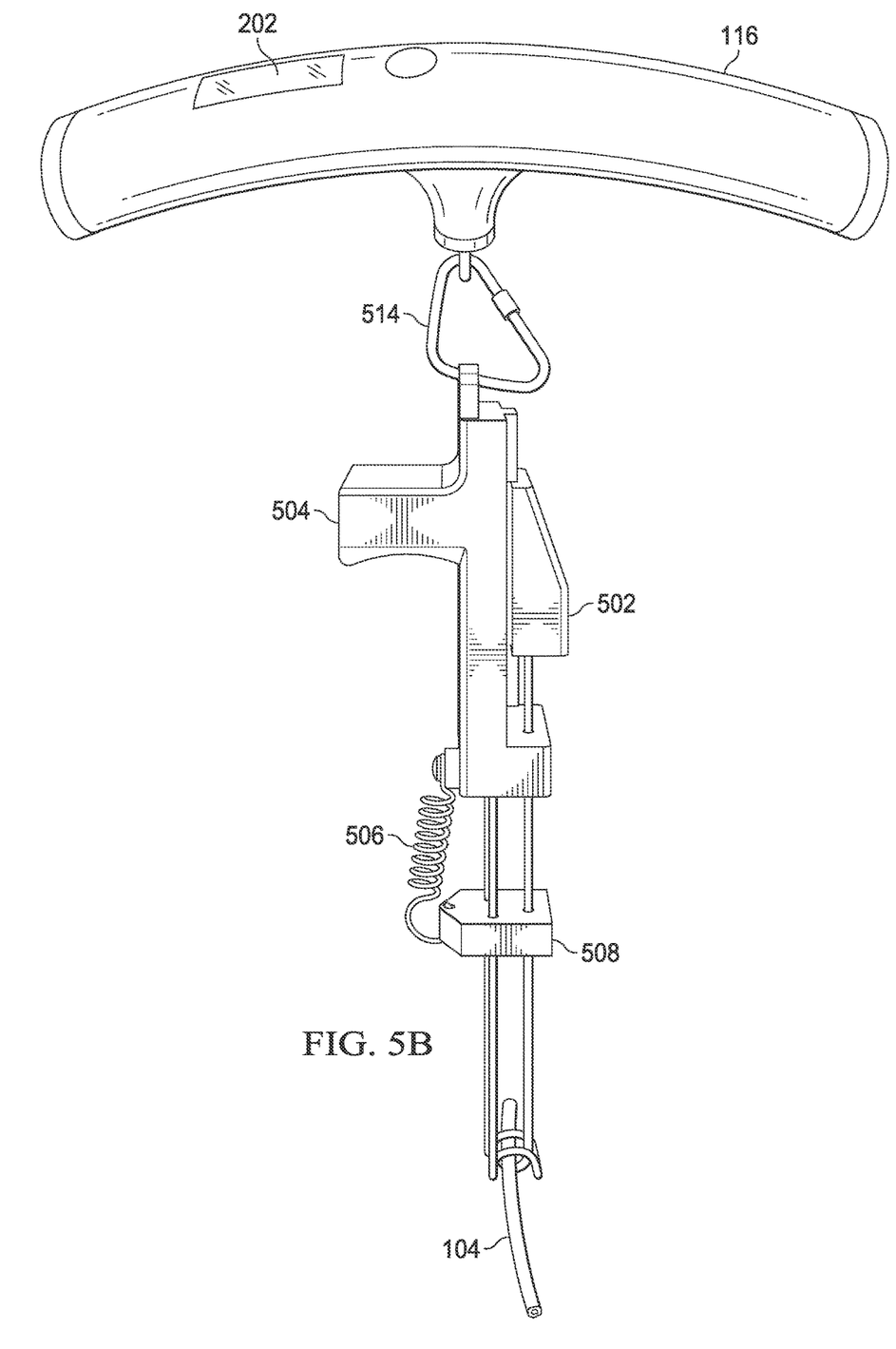
Figure 5C:
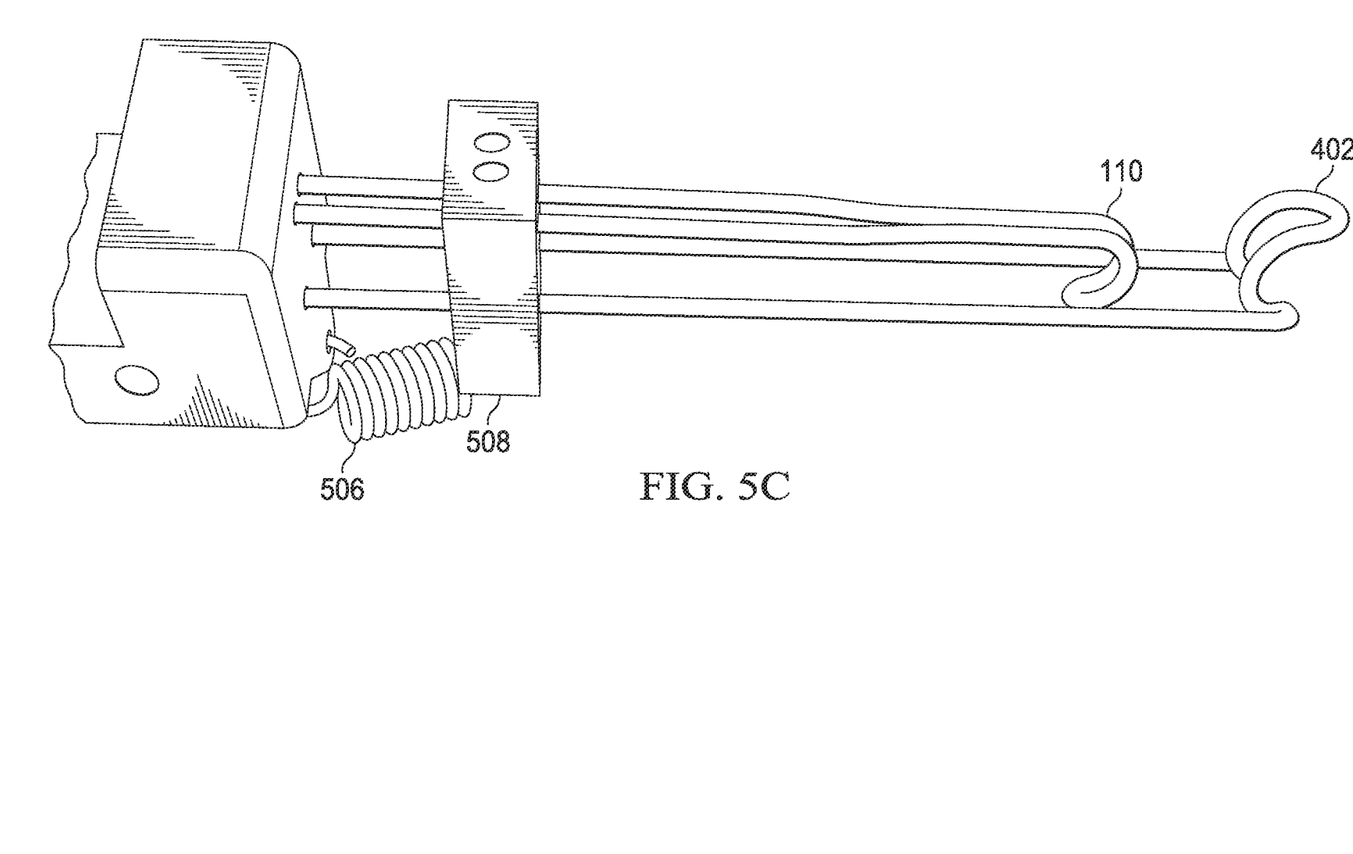

FIGS. 5A through 5C illustrate a fourth example pull testing inspection tool 102d according to this disclosure. For ease of explanation, the inspection tool 102d may be described as being used in the system 100 to test the wire 104 of FIG. 1. However, the inspection tool 102d may be used for pull testing of any other suitable components in any other suitable systems.

As shown in FIGS. 5A through 5C, the inspection tool 102d includes a handle 116 in the form of a crossbar, which extends generally traverse to the length or longitudinal axis of the inspection tool 102d. The handle 116 includes the indicator 202 integrated into the handle 116, although the indicator 202 may be positioned elsewhere as noted above. The inspection tool 102d also includes the connectors 110 and 402. In this example, the connectors 110 and 402 have complementary structures. More specifically, the connector 110 includes a smaller U-shaped hook that can contact one side of a wire 104 or other component under test, and the connector 402 includes an inverted U-shaped hook that can contact another side of the wire 104 or other component under test. The connectors 110 and 402 can apply opposite forces against the wire 104 or other component under test in order to grasp the wire 104 or other component under test between the connectors 110 and 402. For example, the connector 110 can be extended past the connector 402 to receive the wire 104 or other component under test, and the connector 110 can be pulled back towards the connector 402 to clamp the wire 104 or other component under test between the connectors 110 and 402.

In this example, the clamping force applied to the connector 110 is provided by a structure that includes a movable block 502 that can slide relative to a fixed block 504. A spring 506 couples the fixed block 504 to a block 508 that is fixedly connected to the movable block 502 by one or more bars 510. The one or more bars 510 therefore connect the movable block 502 and the block 508 while passing through one or more openings of the fixed block 504. One or more support shafts 404 are coupled to the fixed block 504 and pass through one or more openings of the block 508. One or more additional support shafts 512 couple the connector 110 to the block 508 (rather than using the connecting wire 112). This arrangement allows forward sliding of the movable block 502 to push the block 508 away from the fixed block 504, extending the spring 506 and pushing the connector 110 forward and past the connector 402. When the movable block 502 is released, the spring 506 pulls the block 508 backwards, causing the connector 110 to move towards the connector 402 and clamp onto a wire 104 or other component to be tested.

Note that, in this example, the handle 116 is coupled to the remainder of the inspection tool 102d by a carabiner 514 or other movable component. However, this is not necessarily required, and the handle 116 may be coupled to one or more other components of the inspection tool 102d in any other suitable manner. For example, the handle 116 may include or be coupled to a shaft 204 as described above.

Although FIGS. 2 through 5C illustrate examples of pull testing inspection tools 102a-102d, various changes may be made to FIGS. 2 through 5C. For example, the inspection tools 102a-102d may be used for pull testing of components other than wires. Also, the form factors for the inspection tools 102a-102d themselves and the various components of the inspection tools 102a-102d can easily vary from what is shown in FIGS. 2 through 5C. In general, each inspection tool 102a-102d itself can have any suitable size, shape, and dimensions, and each component of the inspection tool 102a-102d can have any suitable size, shape, and dimensions. In addition, any suitable combination of features shown in FIGS. 2 through 5C may be used together in a single pull testing inspection tool, whether or not that specific combination of features is shown in the figures or described above. As particular examples, any of the pull testing inspection tools shown in FIGS. 2 through 5C may include any suitable type(s) of indicator(s), and either of the pull testing inspection tools 102a-102b shown in FIGS. 2 and 3 may include a pre-grip manually-operated clamp as shown in FIG. 4 or FIGS. 5A through 5C.

Figure 6A:
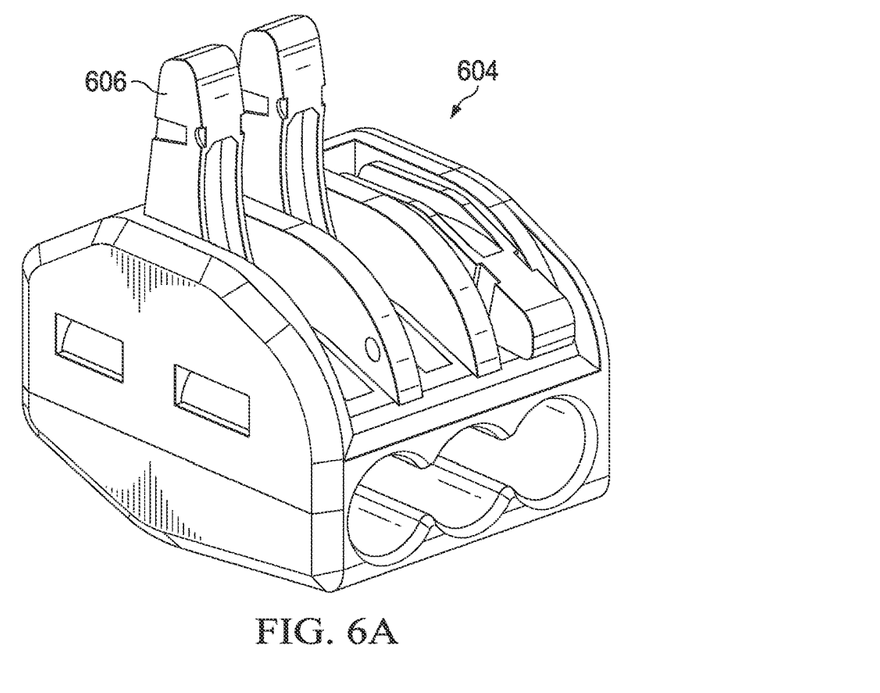
Figure 6B:
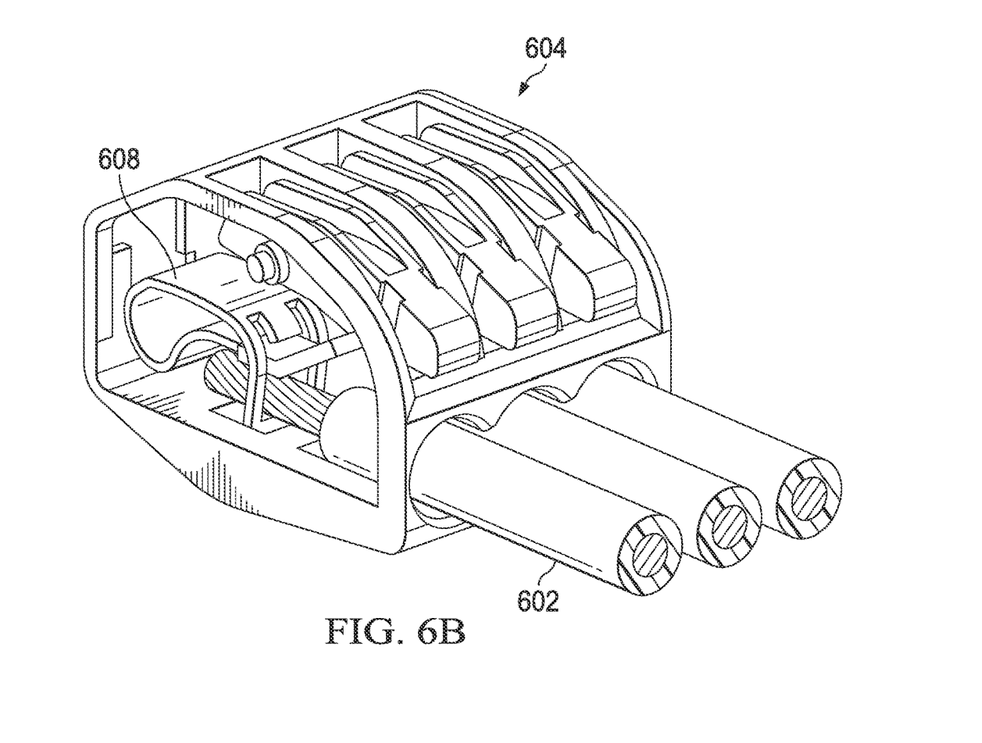

FIGS. 6A through 9 illustrate example uses of pull testing inspection tools according to this disclosure. As shown in FIGS. 6A and 6B, any of the pull testing inspection tools described above or designed in accordance with this disclosure may be used for pull testing of one or more wires 602 that have been inserted in at least one lever nut 604. Each lever nut 604 here includes one or more levers 606, each of which can be opened and closed to control whether an internal clamp 608 of the lever nut 604 clamps onto the stripped end of one of the wires 602. Pull testing can be performed here to ensure that each wire 602 has been adequately secured by the corresponding internal clamp 608 of the associated lever nut 604.

Figure 7:
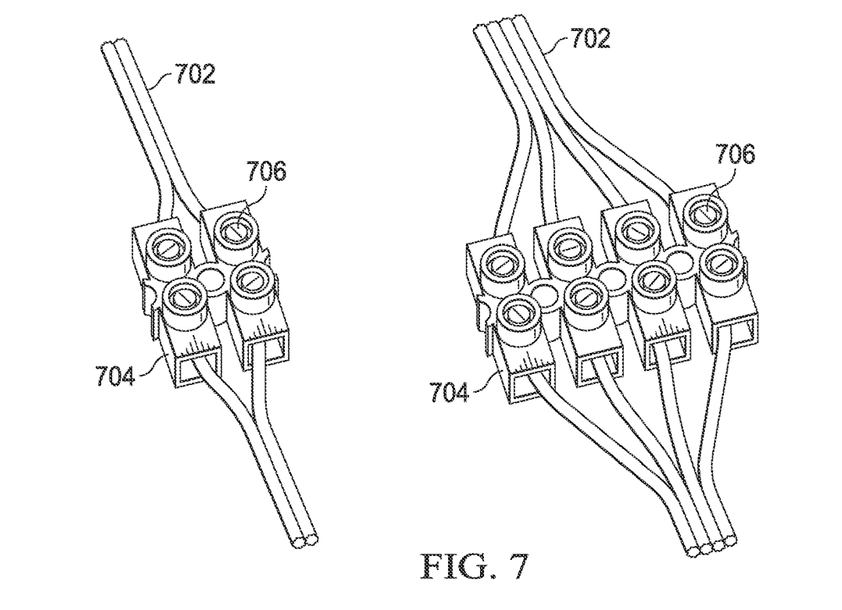

As shown in FIG. 7, any of the pull testing inspection tools described above or designed in accordance with this disclosure may be used for pull testing of one or more wires 702 that have been inserted into one or more screw-style connectors 704, which are sometimes referred to as "Euro" style connectors. The connectors 704 include screws 706 that can be turned to lock onto and release the stripped ends of the wires 702. Internal conductive structures within the connectors 704 allow electrical signals to pass between different wires 702. Pull testing can be performed here to ensure that each wire 702 has been adequately secured by the corresponding screw 706 of the associated connector 704.

Figure 8A:
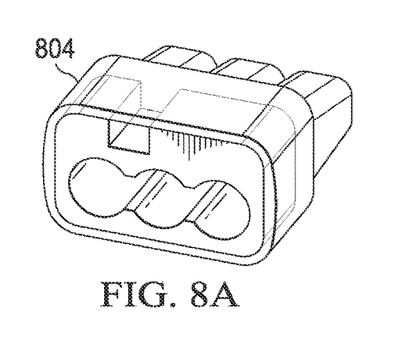
Figure 8B:
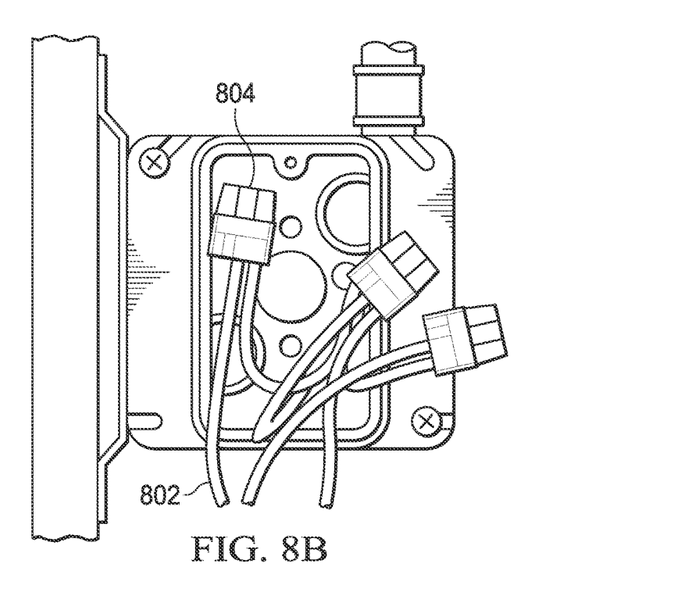

As shown in FIGS. 8A and 8B, any of the pull testing inspection tools described above or designed in accordance with this disclosure may be used for pull testing of one or more wires 802 inserted in at least one push-in wire connector 804. Each push-in wire connector 804 includes internal connectors that facilitate insertion of multiple wires 802 and that resist removal of the wires 802. One or more internal conductive structures within each push-in wire connector 804 allow electrical signals to pass between different wires 802 inserted into the push-in wire connector 804. Pull testing can be performed here to ensure that each wire 802 has been adequately secured by the associated push-in wire connector 804.

Figure 9:
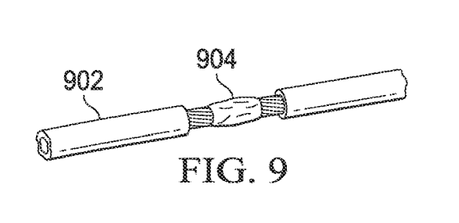

As shown in FIG. 9, any of the pull testing inspection tools described above or designed in accordance with this disclosure may be used for pull testing of one or more wires 902 that are coupled together. In this example, multiple wires 902 may be soldered or otherwise coupled together at a joint 904. Pull testing can be performed here to ensure that each joint 904 has adequate strength to maintain the connection of the associated wires 902.

Although FIGS. 6A through 9 illustrate examples of uses of pull testing inspection tools 102, 102a-102d, various changes may be made to FIGS. 6A through 9. For example, the pull testing inspection tools 102, 102a-102d may be used in any other suitable manner and are not limited to testing wires arranged in the configurations shown in FIGS. 6A through 9.

The following describes example embodiments of this disclosure that implement or relate to pull testing inspection tools. However, other embodiments may be used in accordance with the teachings of this disclosure.

In a first embodiment, an apparatus includes a portable device, which includes a connector configured to contact or grasp a portion of a component and to apply a force on the component during a pull test of the component. The portable device also includes a handle configured to be pulled to apply the force on the component during the pull test of the component. The portable device further includes an indicator configured to at least one of: (i) identify the force being applied to the component during the pull test and (ii) identify when a specified amount of force has been applied to the component during the pull test.

In a second embodiment, a method includes contacting or grasping a component to be tested during a pull test of the component with a connector of a portable device. The method also includes pulling on a handle of the portable device to cause the connector to apply a force on the component during the pull test of the component. The method further includes using an indicator of the portable device to at least one of: (i) identify the force being applied to the component during the pull test and (ii) identify when a specified amount of force has been applied to the component during the pull test.

Any single one or any suitable combination of the following features may be used with the first or second embodiment. A connecting wire may attach the connector to the indicator or the handle, and a hollow sleeve may be configured to receive at least a portion of the connecting wire. The indicator may include an analog or digital tension gauge configured to present the force being applied to the component and/or an analog or digital scale configured to present the force being applied to the component. The indicator may include a force meter configured to provide feedback when the specified amount of force has been applied to the component and/or a fuse configured to break or separate when the specified amount of force has been applied to the component. The indicator may be configured to provide audible or tactile feedback in response to at least the specified amount of force being applied to the component. The connector may represent one of multiple interchangeable connectors. The connector may be configured to release the component during the pull testing to protect the component from excessive force. A second connector may be provided, the connectors may be configured to clamp onto the component, and a slide or lever may be configured to move at least one of the connectors. A spring may be configured to bias the slide or lever and pull one of the connectors towards the handle. The connector may include a hook, the second connector may include an inverted hook, and the hook and the inverted hook may be configured to contact opposite sides of the component.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. An apparatus comprising:
   a portable device comprising:
   a connector configured to contact or grasp a portion of a component and to apply a force on the component during a pull test of the component;
   a handle configured to be pulled to apply the force on the component during the pull test of the component;
   an indicator configured to at least one of: (i) identify the force being applied to the component during the pull test and (ii) identify when a specified amount of force has been applied to the component during the pull test;
   a connecting wire attaching the connector to the indicator or the handle; and
   a hollow sleeve configured to receive at least a portion of the connecting wire.

2. The apparatus of claim 1, wherein the indicator comprises at least one of:
   an analog or digital tension gauge configured to present the force being applied to the component; and
   an analog or digital scale configured to present the force being applied to the component.

3. The apparatus of claim 1, wherein the indicator comprises at least one of:
   a force meter configured to provide feedback when the specified amount of force has been applied to the component; and
   a fuse configured to break or separate when the specified amount of force has been applied to the component.

4. The apparatus of claim 1, wherein the indicator is configured to provide audible or tactile feedback in response to at least the specified amount of force being applied to the component.

5. The apparatus of claim 1, wherein the connector comprises one of multiple interchangeable connectors.

6. The apparatus of claim 1, wherein the connector is configured to release the component during the pull testing to protect the component from excessive force.

7. An apparatus comprising:
   a portable device comprising:
   a connector configured to contact or grasp a portion of a component and to apply a force on the component during a pull test of the component;
   a handle configured to be pulled to apply the force on the component during the pull test of the component;
   an indicator configured to at least one of: (i) identify the force being applied to the component during the pull test and (ii) identify when a specified amount of force has been applied to the component during the pull test;
   a second connector, the connectors configured to clamp onto the component; and
   a slide or lever configured to move at least one of the connectors.

8. The apparatus of claim 7, further comprising:
   a connecting wire attaching the connector to the indicator or the handle; and
   a hollow sleeve configured to receive at least a portion of the connecting wire.

9. The apparatus of claim 7, further comprising:
   a spring configured to bias the slide or lever and pull one of the connectors towards the handle.

10. The apparatus of claim 7, wherein:
the connector comprises a hook;
the second connector comprises an inverted hook; and
the hook and the inverted hook are configured to contact opposite sides of the component.

11. A method comprising:
contacting or grasping a component to be tested during a pull test of the component with a connector of a portable device;
pulling on a handle of the portable device to cause the connector to apply a force on the component during the pull test of the component; and
using an indicator of the portable device to at least one of: (i) identify the force being applied to the component during the pull test and (ii) identify when a specified amount of force has been applied to the component during the pull test;
wherein a connecting wire attaches the connector to the indicator or the handle; and
wherein a hollow sleeve receives at least a portion of the connecting wire.

12. The method of claim 11, wherein the indicator comprises at least one of:
an analog or digital tension gauge configured to present the force being applied to the component; and
an analog or digital scale configured to present the force being applied to the component.

13. The method of claim 11, wherein the indicator comprises at least one of:
a force meter configured to provide feedback when the specified amount of force has been applied to the component; and
a fuse configured to break or separate when the specified amount of force has been applied to the component.

14. The method of claim 11, wherein the indicator provides audible or tactile feedback in response to at least the specified amount of force being applied to the component.

15. The method of claim 11, wherein the connector comprises one of multiple interchangeable connectors.

16. The method of claim 11, further comprising:
releasing the component during the pull testing to protect the component from excessive force.

17. A method comprising:
contacting or grasping a component to be tested during a pull test of the component with a connector of a portable device;
pulling on a handle of the portable device to cause the connector to apply a force on the component during the pull test of the component;
using an indicator of the portable device to at least one of: (i) identify the force being applied to the component during the pull test and (ii) identify when a specified amount of force has been applied to the component during the pull test; and
using a slide or lever to move at least one of the connector and a second connector, the connectors configured to clamp onto the component.

18. The method of claim 17, wherein:
a connecting wire attaches the connector to the indicator or the handle; and
a hollow sleeve receives at least a portion of the connecting wire.

19. The method of claim 17, further comprising:
using a spring to bias the slide or lever and pull one of the connectors towards the handle.

20. The method of claim 17, wherein:
the connector comprises a hook;
the second connector comprises an inverted hook; and
the hook and the inverted hook are configured to contact opposite sides of the component.

* * * * *